United States Patent
Robinson

[11] 3,901,453
[45] Aug. 26, 1975

[54] GRAIN MILL STRUCTURE

[76] Inventor: Elmo C. Robinson, 350 North 750 East, Orem, Utah 84057

[22] Filed: Feb. 14, 1974

[21] Appl. No.: 442,464

[52] U.S. Cl............................. 241/259.1; 241/286
[51] Int. Cl.².......................................... B02C 7/14
[58] Field of Search............. 241/248, 259.1, 259.3, 241/261.2, 286, 287, 289, 290

[56] References Cited
UNITED STATES PATENTS

| | | | |
|---|---|---|---|
| 1,724,318 | 8/1929 | Schuchardt | 241/248 |
| 2,051,716 | 8/1936 | Johnson | 241/259.3 |
| 2,710,726 | 6/1955 | Messing | 241/259.3 X |
| 2,743,874 | 5/1956 | Asplund | 241/259.1 X |
| 3,038,673 | 6/1962 | Fisher | 241/259.1 X |
| 3,688,996 | 9/1972 | Kuest | 241/259.1 X |
| 3,782,647 | 1/1974 | Decker et al. | 241/286 X |

Primary Examiner—Granville Y. Custer, Jr.
Assistant Examiner—Howard N. Goldberg

[57] ABSTRACT

An improved structure for home grain mills of relatively low capacity operation, the same including a stator stone structure and a rotor stone structure. Means are joined to a fixed housing for taking up the thrust of the rotor for various grinds. Adjustable means are provided for displacing the drive shaft of the equipment along its axis so that grinds may be varied. This adjustment is independent of the drive coupling and of the motor mount. In two preferred embodiments there are a threaded adjustment and also a pressure plate or pressure collar adjustment, respectively. In a preferred form of the invention, a sealed bearing is mounted upon the drive shaft, and a bushing encompassing the same is adjustable forwardly and rearwardly within flange structure as desired. The thrust take-up is in the bearing and also in the reaction surface contacting the bushing.

9 Claims, 5 Drawing Figures

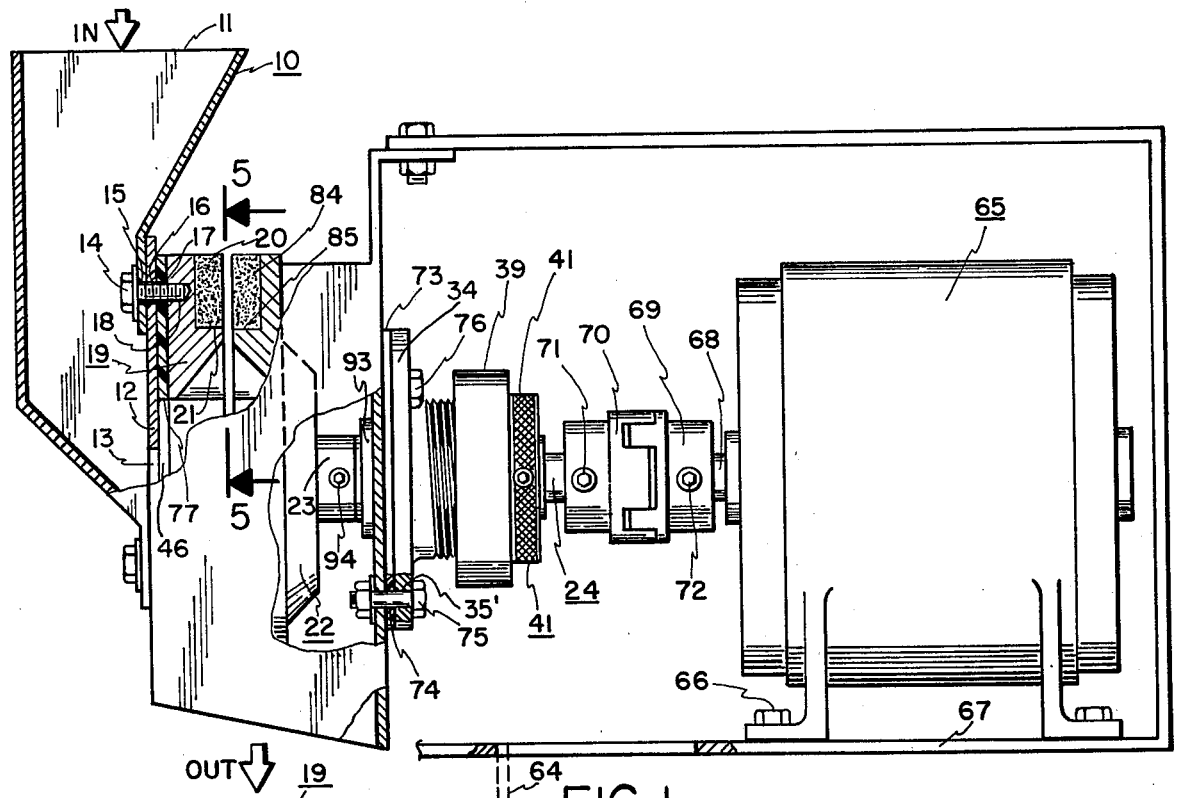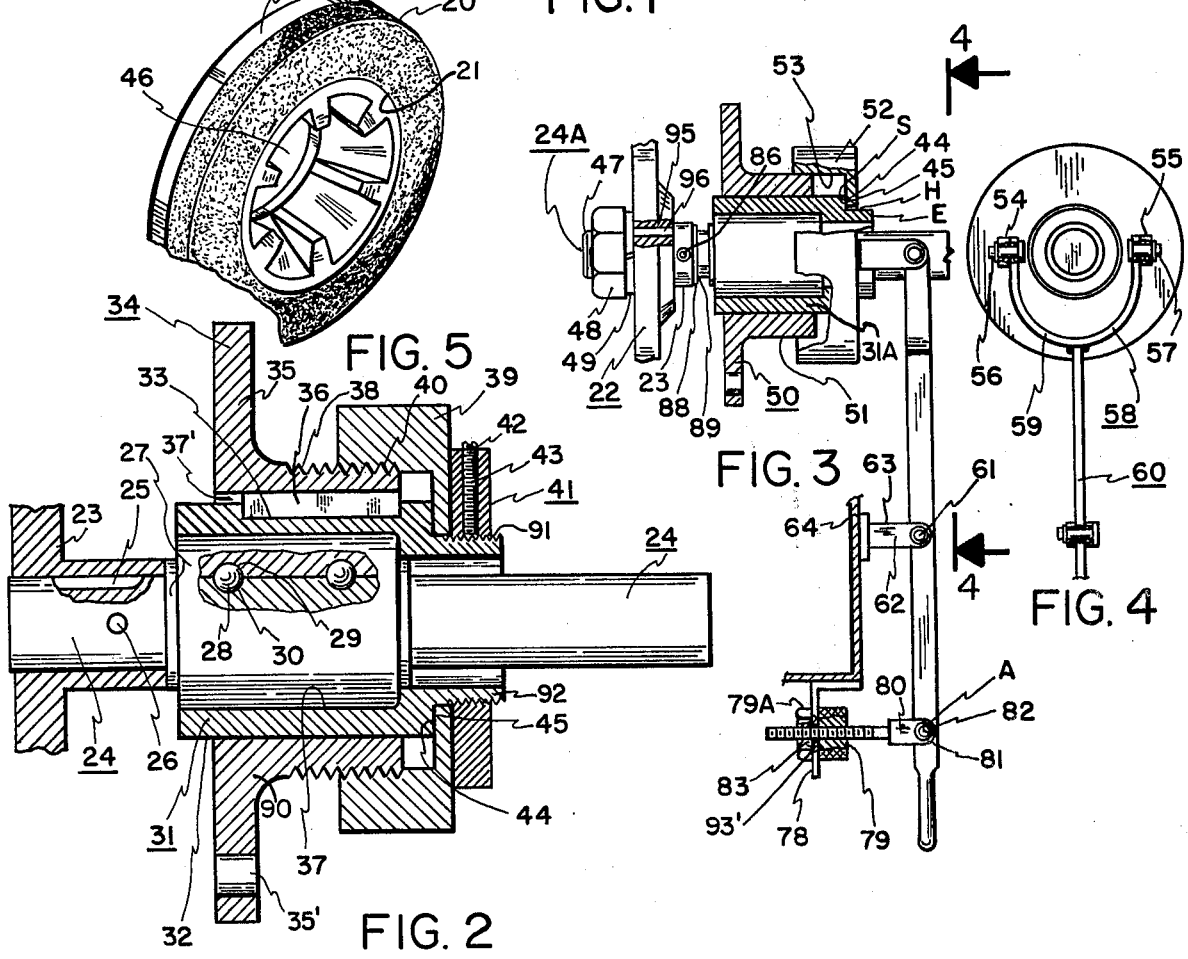

GRAIN MILL STRUCTURE

This invention pertains to grain mills such as wheat mills used in the home or shop. More particularly, the present invention provides a means whereby thrust loads upon the prime mover or motor are reduced or eliminated and, in lieu thereof, there is provided a thrust adjustment for the rotor-stator structure which can be manipulated so as to vary the grind obtainable and also which is constructed to take up the forces of thrust when the equipment is in operation.

In the past there have been a number of different types of mills or grinding equipment provided for general home, farm and shop use. A general approach is to provide a positive drive between the motor or prime mover and the rotor stone of the equipment. In this case, which is the usual case, when grain is introduced then is urged outwardly between the stones, the forces of thrust developed place a direct thrust load upon the sometimes small bearing structures of the motor. This further increases forces of friction within the motor and reduces the efficiency torque and motor life.

In the present invention there is a loose, split coupling between the motor and the drive of the grinding stone rotor. All thrust is taken up through the housing by means of a flange or other equipment that is bolted thereto. More particularly, there is a threaded collar or pressure plate or pressure collar adjustment provided, whereby the revolving shaft coupled to the rotor causes its rearward thrust-force to be taken up by drive-shaft bearings and also the adjustment structure by which the shaft can be translated along its axis.

The adjustment can be made either by a threaded collar, by way of an example, or by way of a pressure plate or pressure cap or collar that can be lever-actuated; in the latter event adjustment would be provided for predetermining the disposition of the lever at any desired moment.

Accordingly, a principal object of the present invention is to provide a new and improved grinding unit or grinding grain in the home or at the shop or farm.

A further object is to provide a grinding mill the rotor stone of which is precluded from applying forces of thrust upon the prime mover directly.

An additional object is to provide a grinding unit having stator and rotor stones, where the rotor stone is provided with incremental adjustable translation means.

An additional object is to provide a grinding mill having a rotor stone provided with a sealed bearing, such bearing itself serving at a rear service thereof to take up thrust forces of the rotor stone, this by contact with some fixed or adjustable structure.

A further object is to provide a grain mill wherein the spacing between the rotor and the stator stone structures can be adjusted by means of moving the rotor shaft incrementally along its axis, this by adjustment means related to a fixed housing, or at least otherwise than related to the prime mover associated therewith.

The features of the present invention may best be understood by reference to the following description taken in connection with the accompanying drawings in which:

FIG. 1 is a side elevation, partially broken away, of a grain mill usable for home or shop use, for example, and incorporating the principles of the present invention.

FIG. 2 is an enlarged detail, shown in vertical section, of the mounting and adjustment structure of the rotor shaft where the latter incorporates a sealed bearing.

FIG. 3 is a side elevation of alternative structure incorporating a pressure collar means for varying rotor, bearing and shaft disposition relative to the stator stone of the equipment; in FIG. 3 a lever arrangement is used for adjusting and taking up forces of thrust.

FIG. 4 is an end view taken along the line 4—4 in FIG. 3.

FIG. 5 is a fragmentary perspective view, taken along the line 5—5 in FIG. 1, of the stator stone structure used in the housing of FIG. 1.

In FIG. 1, hopper 10 includes an inlet opening 11 for receiving wheat or other grain, by way of example. Grinder housing 12 includes an inlet orifice 13, whereby grain fed into the hopper 10 will be introduced through the stator grinding stone structure as hereinafter set forth. One or more bolts 14 may be employed to secure the hopper structure and stator 19, hereinafter described, to housing 12. Thus, bolts 14 may be threaded into the drilled and tapped apertures 18, one being shown, in stator 19. Aperture passageways 15, 16 and 17 facilitate such mounting. The grinding stator 19 is secured to housing 12 by use of an elastomeric gasket 77, thus allowing some slight flexibility for alignment purposes. The stator 19 is shown in perspective view in FIG. 5 and, as seen in FIGS. 1 and 5, includes a stator recessed seat 21 within which stator stone 20 is pressed and/or cemented in place. The structure of the grinding stone and their fabrication may be strictly conventional. In any event, it is seen that aperture or passageway 46 of stator 19 provides for the admission from the hopper of grain introduced therein to the area between the stator and rotor.

The rotor grinding wheel or simply "rotor" 22 includes a rotor stone 84 which is seated in a recessed seat 85, a structural configuration similar to that of stator 19. The rotor 22 of FIG. 3 includes an integral hub 23 and a set screw 86 which serve to secure, with key and keyway 95, 96, the hub 23 of the rotor to shaft 24A. Thus, rotor hub 23 receives the forward or left end of shaft 24A, see FIGS. 2 and 3, and the latter include keyway 25, see FIG. 2, for receiving a key or a keying protuberance of such rotor hub. As a thrust reaction means, there may be provided a snap ring 88, see FIG. 3, that is seated in annular groove 89 of the shaft 24A.

Drive shaft 24 is provided with a sealed thrust bearing 27, see FIG. 2, that is conventional in form and includes bearing balls 28 seated in annular grooves 29 and 30 in a conventional manner. The manner and structure by which a shaft is provided a sealed bearing is well known in the art. Pressed over and integrally moving with sealed bearing 27 is a bushing 31. The latter is provided with an outer slide surface 32 and also a blind keyway 33 accommodating flange key 36. Flange 34 is thus likewise provided, and the same includes an attachment plate 35 having mounting apertures 35'.

Flange 34 of FIG. 2 includes an attachment plate 35 which is integral with a cylindrical portion 90. The cylindrical portion is provided with an inner slide bearing surface 37, keyway 37', also an outer threaded portion 38. Collar 39 includes an inner threaded portion 40 which threads onto the flange in the manner indicated.

A circular lock nut 41 includes a radial, threaded aperture 42 and an Allen-type set screw 43. The threaded lock nut is drilled and tapped as indicated, to thread onto the threads 91 of the turned-down portion 92 of bushing 31. An inner thrust surface 44 of collar 39 serves to abut against the abutment surface 45 of bushing 31, thus to urge the bushing, sealed bearing and shaft forwardly in a direction to the left, i.e., forwardly, thereby tending to close together the grinding stone structures. The flange 34 is itself fastened at its attachment plate 35 to housing structure 67, see FIG. 1, by virtue of the inclusion of elastomeric gasket 73.

In operation and assembly, the stator stone is mounted as indicated in FIG. 1 and as hereinbefore described. Thereafter, the flange and rotor stone structure are made up, either before or after the motor 65 is installed in place by attachments 66 with respect to housing structure 67. Where it is desired to reduce the spacing between the grinding stones or simply to apply further thrust by the rotor against the stator stone, then the collar 39 is simply turned down such that the same moves in a direction to the left. This is the manner in which the bearing 31, see FIG. 2, and shaft 24 are urged forwardly, in a direction to the left, so that a greater thrusting effect can be had by the rotor stone against the stator. As an adjustment limit, lock nut 41 or equivalent, such as a snap ring, is pre-set and its set screw tightened.

It is noted that the motor 65 includes a shaft 68 to which a toothed coupler 69 is affixed and secured as by set screw 72. Likewise, a toothed coupler 70 is supplied the drive shaft 24 and is secured in place by Allen screw means 71. These couplers may be attached to the shaft by splines or by key connections. In any event, the toothed couplers present a forward movement adjustment of the shaft; yet the couplers will still remain in engagement. A splined sleeve connection between opened ends of the two shafts, or any other equivalent, is a permissible inter-shaft coupling. Note that adjustment is permitted during operation.

Accordingly, re-setting of the rotor 22 relative to stator 19 can be accomplished periodically without readjustment of the motor mount or disturbing the shaft drive. Again, this is accomplished merely by turning down collar 39 such that the reaction and abutment surfaces at 44 and 45 cause a forward or rearward movement of the sealed bearing and the rotor end of shaft 24.

An alternate structure is shown in FIG. 3 wherein, this time, the alternate flange 50 has an outer, smooth cylindrical surface 51 which cooperates with an inner smooth surface 53 of alternate collar 52.

Likewise, this time the alternate drive shaft 24A is provided with threads 47 accommodating attachment or mounting nut 48 and lock washer 49. The rotor 22 is seated against snap ring 88, see FIG. 3. FIG. 1 illustrates that a bearing 93 may be utilized in lieu of snap ring 88 of FIG. 3 and, in lieu of a simple set screw 86, there may be provided a pin 94 for disposition through pin aperture 26 in shaft 24 of FIG. 2.

With the collar 52 now assuming simply somewhat of a sliding, pressure-plate function, yet, with the principle of the thrust and reaction surfaces remaining at 44 and 45, the collar may simply be urged forwardly by virtue of the provision of mounting ears 54 and 55, integral with the collar 52. Pivot means pivotally interconnect the opposite arms of yoke 58 and are designated as 56 and 57 in the drawings. Yoke 58 includes a bifurcated end element 59 having an integral lever arm 60. Pivot pin 61 pivots lever arm 60 to an upstanding arm 62 mounted to the housing portion 64 of housing structure 67, designed in any conventional or desired manner. A bracket 78 may be fixedly secured to the structure and be provided with aperture 93' through which an adjustment bolt 80 passes. A threaded lock nut 79 threads onto shaft 80 having bifurcated end 81, pivoted by means 82 to the lever arm 60. The apertures A of the lever and bifurcated end 81 may be enlarged to accommodate a slight arcuate movement that will be involved during lever arm adjustment. Accordingly, the pivoting of lever arm 60 about pivot pin 61 of its mount 62 will accommodate a forward or rearward movement of collar 52, as desired. This in turn will displace the drive shaft 24A, corresponding to shaft 24 in FIG. 1, along its axis either to the right or to the left, this so as to accomplish an increase or decrease in spacing between the rotor and stator of the grinding unit. The knurled lock nut 79 of FIG. 3 will accomplish a locking of the lever in position at the desired place so as to achieve a proper axial placement of the pressed bushing 31A, corresponding to bushing 31 in FIG. 2.

What are provided, therefore, are two representative embodiments of a grinder drive and coupling structure wherein no load is imposed upon the thrust bearings of the drive motor, and wherein the mounting of the motor itself need not be adjusted either for initial installation or for readjustment of grinding stone spacing.

The key and keyway structure of bushing 31 in FIG. 2 and flange 34 should be such as to enable a complete sliding in and out of the bushing relative to the flange. This is seen in FIG. 2. The cooperation of reduced portion E of bushing 31, collar aperture H, and shoulder S of the corresponding bushing 31A of FIG. 3 provides for ease of adjustment and, hence, of the displacement of the bushing and shaft relative to flange 34 and its mounting.

If desired, an additional lock-nut 79A may be provided in FIG. 3 so that, at a particular adjustment, the lever 60 will move in neither direction.

Emergency, or other power sources, such as a windmill, bicycle wheel, manually operated gear train, or other apparatus, may likewise be used to power the equipment.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. In a grain grinding mill apparatus having structure defining a grinding compartment, a grinding stator fixedly disposed in said compartment and attached to said structure, a grinding rotor cooperatively disposed proximate to and aligned with said grinding stator, and a motor having an output shaft and a first coupler connected to said output shaft; an improvement comprising a drive shaft having one end axially connected to said grinding rotor and a remaining end provided with means for coupling said drive shaft to said first coupler, a thrust-journal bearing bearing-keyed to and encompassing said drive shaft, a bushing lockingly encompassing and securing said thrust-journal bearing, a flange having an interior slide bore and slidably receiving said bushing mounted to said structure, a collar engaging said bushing and circumferentially disposed over said flange, means for fixing the disposition of said collar relative to said flange, said last-mentioned means including screw-thread adjustment means operably disposed with respect to said housing and said collar, and means for releasably locking said screw-thread adjustment means.

2. Structure according to claim 1 wherein said bushing is keyed to said flange.

3. In a grain grinding mill apparatus having structure defining a grinding compartment, a grinding stator fixedly disposed in said compartment and attached to said structure, a grinding rotor cooperatively disposed proximate to and aligned with said grinding stator, and a motor having an output shaft and a first coupler connected to said output shaft; an improvement comprising a drive shaft having one end axially connected to said grinding rotor and a remaining end provided with means for coupling said drive shaft to said first coupler, a thrust-journal bearing bearing-keyed to and encompassing said drive shaft, a bushing lockingly encompassing and securing said thrust-journal bearing, a flange having an interior slide bore and slidably receiving said bushing mounted to said structure, a collar engaging said bushing and circumferentially disposed over said flange, means for fixing the disposition of said collar relative to said flange, and wherein said flange and collar include mutually cooperating threads.

4. In a grain grinding mill apparatus having structure defining a grinding compartment, a grinding stator fixedly disposed in said compartment and attached to said structure, a grinding rotor cooperatively disposed proximate to and aligned with said grinding stator, and a motor having an output shaft and a first coupler connected to said output shaft; an improvement comprising a drive shaft having one end axially connected to said grinding rotor and a remaining end provided with means for coupling said drive shaft to said first coupler, a thrust-journal bearing bearing-keyed to and encompassing said drive shaft, a bushing lockingly encompassing and securing said thrust-journal bearing, a flange having an interior slide bore and slidably receiving said bushing mounted to said structure, a collar engaging said bushing and circumferentially disposed over said flange, means for fixing the disposition of said collar relative to said flange, and wherein said collar comprises a cap, said bushing having an annular recessed shoulder engaging said cap.

5. In a grain grinding mill apparatus having structure defining a grinding compartment, a grinding stator fixedly disposed in said compartment and attached to said structure, a grinding rotor cooperatively disposed proximate to and aligned with said grinding stator, and a motor having an output shaft and a first coupler connected to said output shaft; an improvement comprising a drive shaft having one end axially connected to said grinding rotor and a remaining end provided with means for coupling said drive shaft to said first coupler, a thrust-journal bearing bearing-keyed to and encompassing said drive shaft, a bushing lockingly encompassing and securing said thrust-journal bearing, a flange having an interior slide bore and slidably receiving said bushing mounted to said structure, a collar engaging said bushing and circumferentially disposed over said flange, means for fixing the disposition of said collar relative to said flange, and wherein said collar slidably encompasses said flange and engages said bushing, said apparatus including pressure means for urging said collar against said bushing.

6. Structure according to claim 5 wherein said pressure means comprises a lever engaging said collar, fulcrumed to said structure, and provided with disposition adjustment means.

7. In a grain grinding mill apparatus having structure defining a grinding compartment, a grinding stator fixedly disposed in said compartment and attached to said structure, a grinding rotor cooperatively disposed proximate to and aligned with said grinding stator, and a motor having an output shaft and a first coupler connected to said output shaft; an improvement comprising a drive shaft having one end axially connected to said grinding rotor and a remaining end provided with means for coupling said drive shaft to said first coupler, a thrust-journal bearing bearing-keyed to and encompassing said drive shaft, a bushing lockingly encompassing and securing said thrust-journal bearing, a flange having an interior slide bore and slidably receiving said bushing mounted to said structure, a collar engaging said bushing and circumferentially disposed over said flange, means for fixing the disposition of said collar relative to said flange, and wherein said apparatus includes an elastomeric gasket between said flange and said housing.

8. In a grain grinding mill apparatus having structure defining a grinding compartment, a grinding stator fixedly disposed in said compartment and attached to said structure, a grinding rotor cooperatively disposed proximate to and aligned with said grinding stator, and a motor having an output shaft and a first coupler connected to said output shaft; an improvement comprising a drive shaft having one end axially connected to said grinding rotor and a remaining end provided with means for coupling said drive shaft to said first coupler, a thrust-journal bearing bearing-keyed to and encompassing said drive shaft, a bushing lockingly encompassing and securing said thrust-journal bearing, a flange having an interior slide bore and slidably receiving said bushing mounted to said structure, a collar engaging said bushing and circumferentially disposed over said flange, means for fixing the disposition of said collar relative to said flange, and wherein locking nut means is provided to secure said collar in a closed disposition relative to said bushing.

9. In a grain grinding structure having a revolvable, axially translatable grinding rotor, a fixed grinding stator aligned with and proximate said grinding rotor, and a fixed housing containing said grinding rotor and grinding stator, screw-thread structure fixedly disposed with respect to said fixed housing, first means for taking up thrust loads affixed to said grinding rotor, and second means operably coupled to and between said first means and said housing for varying the disposition of said grinding rotor within said housing, said second means including adjustable threaded structure threadedly engaging said screw-thread structure, and locking means releasably backing said threaded structure.

* * * * *